(12) United States Patent
Bernard et al.

(10) Patent No.: US 10,527,086 B2
(45) Date of Patent: Jan. 7, 2020

(54) STRUT COMPRISING COMPOSITE CYLINDER WITH A MID-STRUT FITTING

(71) Applicant: Crompton Technology Group Limited, Solihull West Midlands (GB)

(72) Inventors: James Bernard, Brackley Strathclyde (GB); Will Pollitt, Warwickshire (GB); Ioannis Giannakopoulos, London (GB)

(73) Assignee: CROMPTON TECHNOLOGY GROUP LIMITED, Shirley, Solihull, West Midlands (GB)

( * ) Notice: Subject to any disclaimer, the term of this patent is extended or adjusted under 35 U.S.C. 154(b) by 194 days.

(21) Appl. No.: 15/639,113

(22) Filed: Jun. 30, 2017

(65) Prior Publication Data

US 2019/0003522 A1 Jan. 3, 2019

(51) Int. Cl.
*F16C 3/02* (2006.01)
*F16D 1/072* (2006.01)
*B29C 65/64* (2006.01)
*B29C 65/00* (2006.01)
*B29C 53/58* (2006.01)
(Continued)

(52) U.S. Cl.
CPC .......... *F16C 3/026* (2013.01); *B29C 37/0082* (2013.01); *B29C 53/583* (2013.01); *B29C 65/64* (2013.01); *B29C 66/74* (2013.01); *B29C 70/30* (2013.01); *B64C 25/60* (2013.01); *F16B 7/0413* (2013.01); *F16C 7/026* (2013.01); *F16D 1/072* (2013.01); *B29D 99/0046* (2013.01); *B64C 2025/006* (2013.01); *F16C 2326/43* (2013.01); *F16D 2001/103* (2013.01)

(58) Field of Classification Search
CPC .......... F16C 3/026; F16D 1/072; B29C 65/64; B29C 53/583; B29C 66/74; B29D 99/0046; B64C 25/60
See application file for complete search history.

(56) References Cited

U.S. PATENT DOCUMENTS 4,875,717 A * 10/1989 Policelli ................ F16L 47/04
                                                        285/222.1
5,415,079 A    5/1995 Ching
(Continued)

FOREIGN PATENT DOCUMENTS

EP    2930377 A1    10/2015
JP    7238918 A     9/1995

OTHER PUBLICATIONS

Extended European Search Report for EP Application No. 16167027.8-1706, dated Jun. 20, 2017, pp. 1-7.

*Primary Examiner* — Vishal R Sahni
(74) *Attorney, Agent, or Firm* — Cantor Colburn LLP

(57) ABSTRACT

A strut comprises a composite cylinder with a mid-strut fitting mounted on an interface region on a mid-portion of said cylinder. At least in the interface region, layers of helical-filaments are displaced radially-outward and even inclined with respect to an axis of the cylinder such that they may follow a path with a radial component. A mid-strut fitting is provided which has a plurality of teeth on an inner circumferential surface. The plurality of teeth engage the helical-filaments in the interface region to provide a mechanical connection. Portions of surface and intermediate layers of the helical-filaments may be removed to expose ends of those filaments in the interface region before mounting the mid-strut fitting on the cylinder.

19 Claims, 6 Drawing Sheets

(51) Int. Cl.
  *B64C 25/60* (2006.01)
  *B29C 70/30* (2006.01)
  *F16B 7/04* (2006.01)
  *B29C 37/00* (2006.01)
  *F16C 7/02* (2006.01)
  *B29D 99/00* (2010.01)
  *F16D 1/10* (2006.01)
  *B64C 25/00* (2006.01)

(56) References Cited

U.S. PATENT DOCUMENTS

| | | | |
|---|---|---|---|
| 5,601,493 | A | 2/1997 | Nakazono et al. |
| 7,731,593 | B2 | 6/2010 | Dewhirst et al. |
| 7,874,925 | B2 | 1/2011 | Dewhirst |
| 8,001,996 | B2 | 8/2011 | Paulshus et al. |
| 8,721,829 | B2 | 5/2014 | Jacobsen et al. |
| 9,056,431 | B2 | 6/2015 | Bond et al. |
| 2002/0041790 | A1 | 4/2002 | Suzuki et al. |
| 2006/0258469 | A1 | 11/2006 | Dewhirst et al. |
| 2008/0012329 | A1 | 1/2008 | Dewhirst |
| 2010/0055383 | A1 | 3/2010 | Schalla et al. |
| 2011/0192528 | A1 | 8/2011 | Kozaki et al. |
| 2012/0060636 | A1 | 3/2012 | Dewhirst |
| 2012/0163905 | A1 | 6/2012 | Bond et al. |
| 2013/0062012 | A1 | 3/2013 | Masson et al. |
| 2015/0284957 | A1* | 10/2015 | Ganis .................. E04C 3/36 403/376 |
| 2016/0153489 | A1* | 6/2016 | Pollitt ................ B29C 53/585 403/343 |
| 2016/0341228 | A1* | 11/2016 | Luce .................... B29C 70/682 |

* cited by examiner

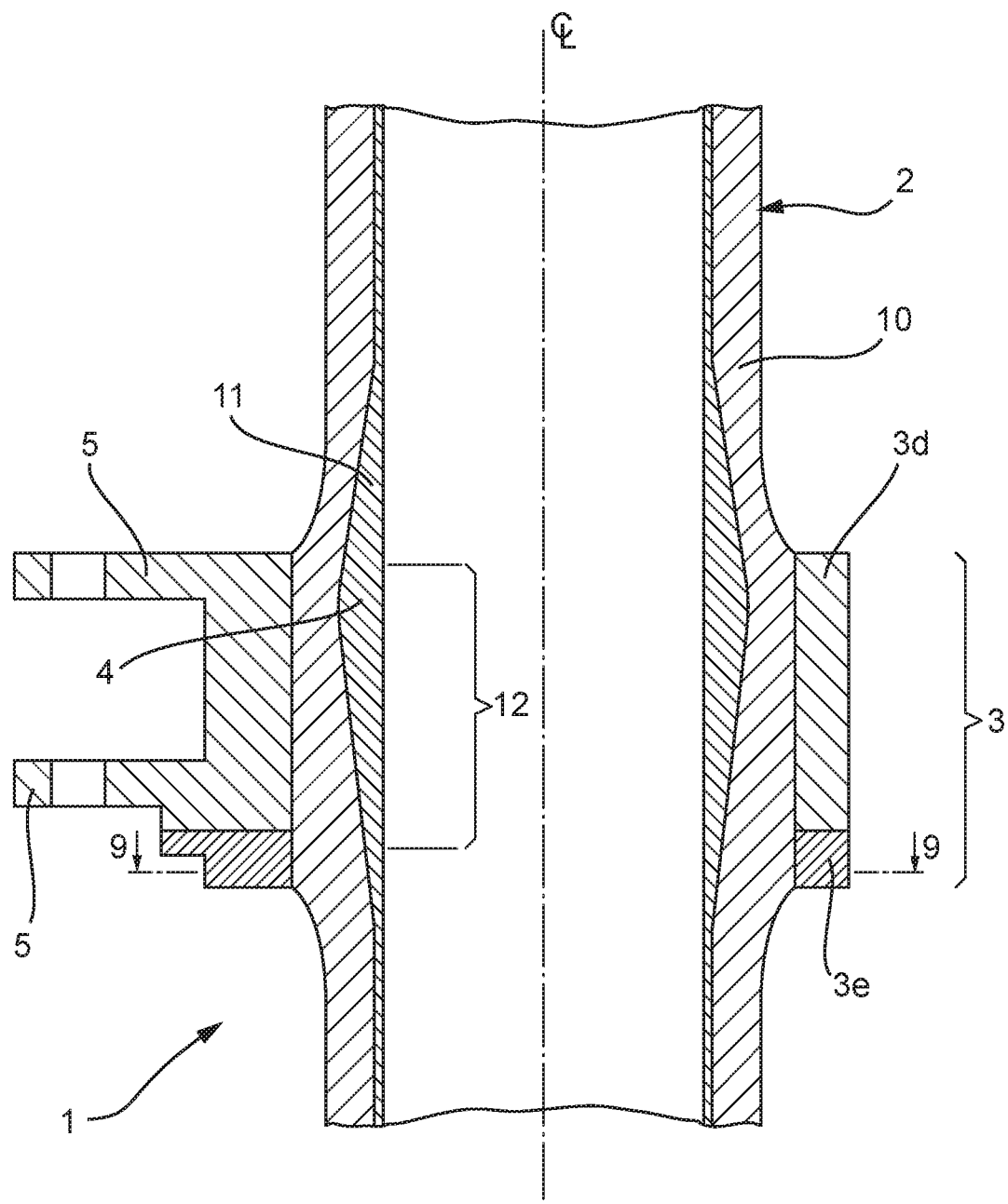

STRUT COMPRISING COMPOSITE CYLINDER WITH A MID-STRUT FITTING

TECHNICAL FIELD

This disclosure relates to a strut comprising a composite cylinder with a mid-strut fitting, in particular a composite cylinder comprising helical-filaments. In one example, the strut may be a landing gear shock strut of an aircraft. The present disclosure also has wider application to other forms of strut used in land or water-based vehicles, or fixed structures such as bridges and buildings.

BACKGROUND

Landing gear shock struts have been conventionally made of forged steel and comprise lugs for attachment of other components such as rods, arms, stays and braces (collectively referred to herein as "braces") that transmit axial and bending forces and/or torque through to the cylinder of the shock strut. Efforts have been made to reduce the weight of aircraft struts and the use of lighter-weight materials such as titanium and aluminium has been developed. However these materials do not offer the step change in weight that carbon fibre composites do.

Composites are being used increasingly in applications to reduce the weight of structures. They are being employed to greater extents in aircraft landing gear components, replacing metal items such as braces, etc. It would be desirable to reduce landing gear weight further and make a shock strut cylinder from composite materials to reduce the weight of this part.

Composite shafts and other cylindrical members are typically formed by winding filaments such as carbon fibres around a mandrel in a helical fashion so as to build up a tubular shape. The filaments may be braided prior to being laid helically on the mandrel. The angle of the helical filaments influences the properties of the shaft and usually the shaft will comprise several layers of filaments wound at different winding angles. Various developments have been made to couple such composite shafts with metallic end fittings, i.e., to connect the orthotropic tubular structures with fittings having generally isotropic properties.

US 2012/0060636 A1 describes a clamping-type joint in which the composite fibres at the end of a shaft are trapped between a nut located inside the composite tube and an external collar that surrounds the tube of composite. A threaded end fitting component can be used to move the nut and the collar closer together, thus clamping the strut fibres therebetween.

US 2006/0258469 A1 describes a method of forming a composite shaft such that an internally splined end fitting can be axially press fit over the shaft resulting in good torque load transfer properties. US 2008/0012329 A1 describes a particularly advantageous spline profile for this end fitting.

In addition to supporting axial forces from the weight of an aircraft during take-off and landing, an aircraft landing gear shock strut must also withstand significant bending forces due to transverse loads transferred through braces, as well as some torque loads to either prevent the wheels from twisting undesirably from the intended direction during such manoeuvres or to enable the landing gear to steer the aircraft when required. On a metallic landing gear strut, lugs and other attachment features that are positioned midway along the strut can be incorporated into the casting or forging. However, when making the strut of composite materials, a problem arises of how to transmit and distribute axial forces, side loads and/or torque from the other components of the landing gear into the cylinder of the strut at points midway along the strut.

Similar considerations apply to other fields when struts that are generally subject to substantial compressive or tensile loads are being replaced by composite structures and where other force-transmitting components are required to be attached midway along the strut.

SUMMARY

According to this disclosure, there is provided a strut comprising a composite cylinder with a mid-strut fitting mounted on an interface region in a mid-portion of said cylinder, wherein: said cylinder comprises layers of filaments laid in a helical configuration to define a cylinder wall, wherein at least in said interface region, layers of the helical-filaments are displaced radially-outward by an underlying formation, and wherein a plurality of teeth provided on an inner circumferential surface of the mid-strut fitting engage with one or more layers of the helical-filaments in the interface region to make a mechanical connection. The underlying formation may comprise hoop-filaments.

The term "hoop-filaments" used herein refers to filaments or tows of filaments that are wound or otherwise placed in a generally circumferential configuration. The filament, or more usually, tow or part-tow of filaments, is wrapped as a hoop about the cylinder such that the filament or tow lies alongside directly adjacent itself on each revolution. The winding or placement angle will be dependent on the width of the filament bundle being placed, e.g. a part of a tow or a full tow of filaments; in general the filaments will follow a helical path which is inclined close to circumferential, e.g. inclined at more than 78° to the cylinder axis, for example, between 80 to 89°. The term "helical-filaments" used herein refers to filaments that follow a more expanded helical path along the cylinder, such that they have a significant axial component per revolution, so as to transmit axial loads along the length of the filaments. The helical-filaments follow a helical path which is inclined at an angle less than the hoop-filaments e.g. less than 80° to the cylinder axis. For example, the helical filaments may have an angle of inclination of between 8 to 70° to the cylinder axis.

The underlying formation may comprise an annular step that is of a radial-height which is greater than a radially-inward projection of the plurality of teeth of the mid-strut fitting. It may comprise an annular step of hoop-filaments.

The underlying formation may comprise an annular ramp, the outer surface of which serves to radially-incline layers of overlying helical-filaments with respect to an axis of the cylinder such that they follow a path with a radial component over the ramp. In particular, the underlying formation may comprise a double-ramp formation which serves to radially-incline layers of overlying helical-filaments with respect to the axis of the cylinder over each ramp. The underlying formation may comprise an annular ramp of hoop filaments, or a double-ramp formation of hoop-filaments.

At least in the interface region, portions of filaments in surface and intermediate layers may have been removed so as to expose ends of the filaments in those layers. The portions of filaments may have been removed by cutting or grinding an outer surface of the cylinder wall parallel to the axis of the cylinder in said interface region.

At least in the interface region, the inclined filaments may be inclined radially at an angle of 1 to 15° to the axis of the cylinder. The inclined filaments may be inclined radially at an angle of 5 to 10°.

A maximum thickness of the underlying formation may represent between 10-90% of a radial thickness of the cylinder wall. A maximum thickness of the underlying formation may represent between 25-75% of a radial thickness of the cylinder wall. The underlying formation may comprise hoop-filaments.

The underlying formation may extend radially-outward from an inner surface of the cylinder. In an alternative embodiment the underlying formation may extend radially-outward from an intermediate layer of the filaments within the cylinder. In both situations, the underlying formation may comprise hoop-filaments.

The teeth may have a profile that comprises a cutting tooth portion arranged to cut into the interface region and a substantially flat land portion that frictionally engages with the interface region. The profile may further comprise at least one channel portion adjacent to the cutting tooth portion to accommodate debris produced during a mounting process.

The mid-strut fitting may further comprise gaps across the teeth that divide the teeth into a plurality of part-teeth.

The mid-strut fitting may comprise first and second portions. The portions may have been mounted separately. The first portion may have teeth which extend at an angle of between 0 and 45° to the axis of the mid-strut fitting, optionally 0 to 25°, and a second portion may have teeth which extend at an angle of between 45 to 90° to the axis, optionally 65 to 90°.

A wall thickness of the cylinder in the interface region may be greater than a wall thickness in a remainder of the cylinder. The wall thickness of the cylinder either side of the interface region may be thinner on one side of the interface region compared to the other.

The mid-strut fitting may be metallic. It may comprise a metallic lug.

The strut may be for an aircraft. It may be an aircraft shock strut cylinder.

Viewed from a second aspect, the present disclosure can be seen to provide a method of mounting a mid-strut fitting onto a composite cylinder to form a strut, comprising: installing a formation during a lay-up of filaments which are being placed to form a wall of the cylinder; placing layers of helical-filaments to build up the wall of the cylinder including placing layers of helical-filaments over the formation, the overlaying helical-filaments being displaced radially-outward (compared to a remainder of the cylinder) by the underlying formation; and mounting said mid-strut fitting onto said cylinder by engaging a plurality of teeth provided on an inner circumferential surface of the mid-strut fitting into said interface region to provide a mechanical connection between the mid-strut fitting and the composite cylinder.

In the method, the step of installing a formation may comprise placing hoop-filaments to form the formation. The method may include the steps of: curing the composite cylinder; and removing portions of helical-filaments from surface and intermediate layers such that ends of those filaments are exposed in said interface region. This may be performed by cutting or grinding an outer surface of the cylinder wall in the interface region parallel to an axis of the cylinder.

The underlying formation may be formed by placing hoop-filaments as an annular ramp formation, in particular as a double-ramp formation. The underlying formation may be formed by placing hoop-filaments either onto a surface of a mandrel prior to placing the layers of helical-filaments, or onto an intermediate layer of helical-filaments prior to placing further layers of helical-filaments.

BRIEF DESCRIPTION OF DRAWINGS

One or more non-limiting examples will now be described in more detail, by way of example only, and with reference to the accompanying figures in which:

FIG. 8 shows schematically an enlarged axial cross-section through a composite shock strut, showing a ramp of hoop-wound filaments, the helical plies and the mid-strut fitting.

DETAILED DESCRIPTION

Figure 1:
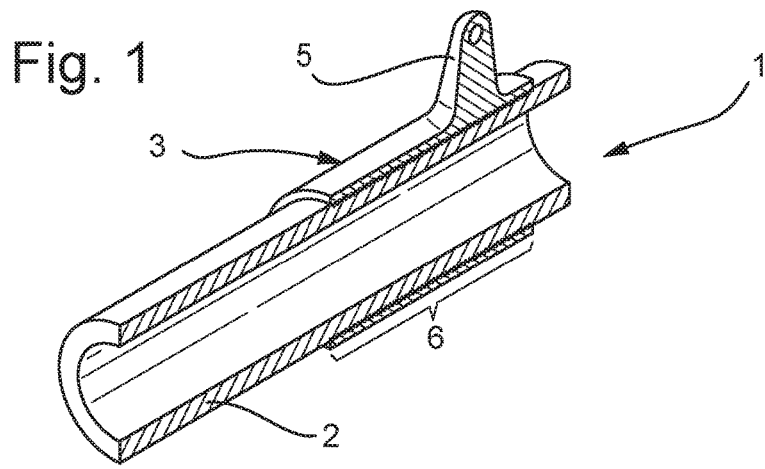
FIG. 1 illustrates an exemplary mid-strut fitting joined to a composite cylinder.

FIG. 1 shows a tension-compression and/or torque transmission joint 1 comprising a composite cylinder 2 with a metal mid-strut fitting 3 mounted thereon. The thickness of such a composite cylinder 2 is built up from a large number of layers of helical-filaments. The helical-filaments may be of carbon fibre. They may be wound, braided, wrapped as tape or laid as a tow, or in some other way deposited on a mandrel (which may be rotated or stationary) as continuous filaments so as to build up the wall of the cylinder. In the present disclosure, the phrases "placing hoop-filaments" or "placing layers of helical-filaments" used herein is intended to refer to all such methods of laying up the filaments.

In use, the mid-strut fitting 3 may be connected to other equipment, for example, via one or more flanges 5 or one or more lugs (see FIGS. 4 to 6 and FIG. 8 as well as the related description below).

Mid-strut fitting 3 has a cylindrical attachment part 6 for attachment to the cylinder 2 which is internally provided with a plurality of teeth 7. It has an internal diameter sized for engagement with the outer diameter of the interface region of the cylinder 2 as will be explained further below.

According to the present disclosure, under the layers of helical-filaments 11 or within them, an underlying formation 11 is provided which displaces overlying layers of helical filaments 10 in a radially-outward direction in this area. The underlying formation may comprise hoop-filaments. This underlying formation increases the diameter of the cylinder 2 locally to form the interface region 12. The plurality of teeth 7 provided on the inner circumferential surface of the mid-strut fitting engage with one or more layers of the helical-filaments 10 of the cylinder 2 in the interface region 12 to make a mechanical connection.

By hoop-filaments, it is meant the filaments that are placed in a hoop-like fashion, where the filament or tows of filaments are placed substantially adjacent each other as hoops so that they follow a generally circumferential path about the cylinder. In contrast, the helical-filaments follow a steeper path with a greater axial distance between each turn, to carry axial forces along the length of the filaments.

Figure 2A:
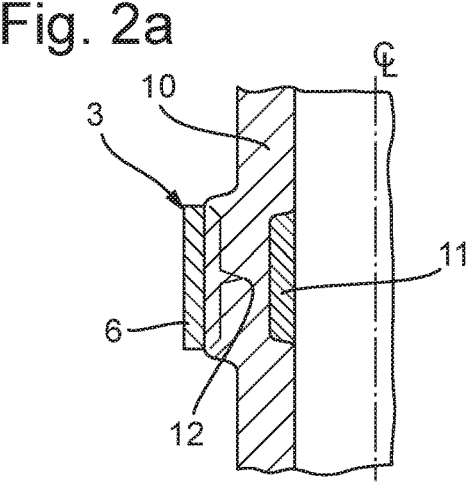
FIGS. 2a to 2f show schematic cross-sections through one half of a connection, illustrating different possibilities for an underlying formation of hoop-filaments.

In one exemplary embodiment shown in FIG. 2a, the underlying formation of hoop-filaments 11 comprises an annular step, for example, a cylindrical step, that is of a radial-height which is greater than the radially-inward projection of the plurality of teeth of the mid-strut fitting (the teeth are not visible in FIG. 2a). In this embodiment, the layers of helical-filaments 10, as they pass along the cylinder 2 and over the underlying cylindrical step of hoop-filaments 11, continue to follow a helical path which extends generally parallel with the axis of the cylinder (with a slight step in the path as the helical-filaments step up over the underlying formation of hoop-filaments 11).

This outward displacement expands the cylinder locally over the hoop-filaments in a circumferential direction. Since the outer diameter of the cylinder 2 is enlarged in the interface region, the inner diameter of the mid-strut fitting 3 can be sized to be passed over the cylinder 2 from one end without the teeth damaging the outer surface of the cylinder 2. The axial extent of the underlying hoop-filament formation 11 causing the outward displacement may correspond to the axial length of the mid-strut fitting 3 and/or of the intended interface region, or it may be longer as desired, e.g. to provide additional hoop strength.

In the exemplary embodiment of FIG. 2a, a mechanical connection is made only with the outer surface layers of helical-filaments 10. This has benefits over arrangements where a mid-strut fitting 3 is, say, bonded directly to the outer surface of a composite cylinder and is reliant solely on the bond with the cylinder to transmit forces. Bonded connections often require significant process controls, for example, to ensure that there are no defects in the joint, that the surface finishes are within acceptable tolerances, that the alignment of the components is correct and/or that the bond gap is below a threshold. Thus, the technical risks and/or significant cost of these process controls is/are successfully mitigated. Alternatively there may be an over-compensation in the size of the joint, for example, a longer mid-strut fitting 3, to take account of potential reductions in strength of one or more of the joined components which may arise, the extra length then leading to additional weight. A mechanical connection, on the other hand, between the mid-strut fitting 3 and the cylinder 2 can result in a more reliable and potentially lighter-weight connection which the industry may be more willing to accept.

Thus the mid-strut connection of the present disclosure may allow carbon fibre reinforced products to be used in landing gear shock struts in place of their metal counterparts, providing the benefits of large weight savings, inherent corrosion resistance, improved fatigue performance and reduced lead times through avoiding the need for large forgings.

In the exemplary embodiment of FIG. 2a, the axial load transfer along the cylinder requires some of the load to be distributed between the layers (plies). While this connection may be adequate for some applications, it is reliant on the interlaminar shear strength of the laminate to distribute load from the outermost plies to the innermost plies.

Figure 2B:
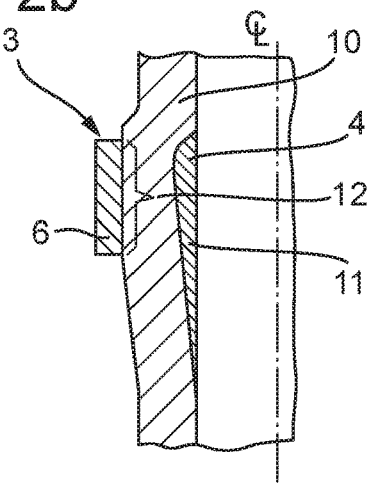

In another exemplary embodiment shown in FIG. 2b, the underlying formation 11 of hoop-filaments may comprise an annular ramp formation 11, the outer surface of which slopes with respect to the cylinder axis and serves to incline the overlying helical-filaments 10 radially with respect to the axis of the cylinder 2.

Figure 2C:
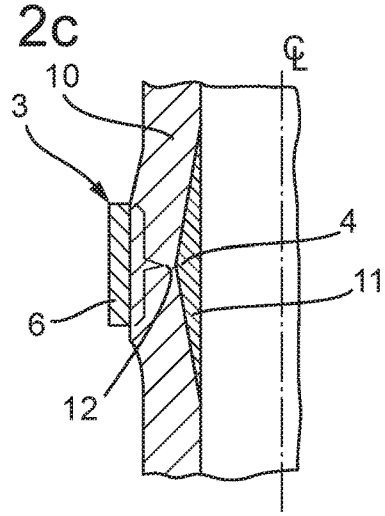
Figure 2D:
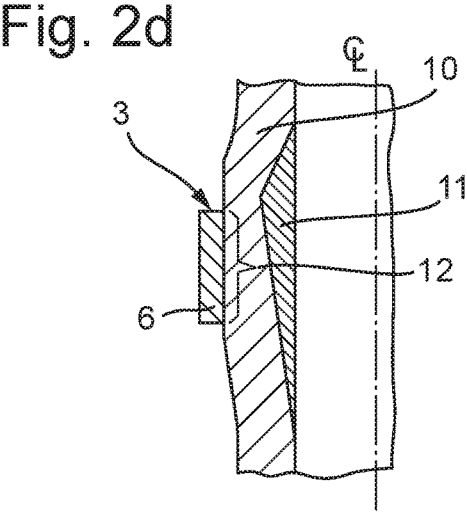

As shown in FIGS. 2c and 2d, the underlying formation of hoop-filaments 11 may comprise a double-ramp formation 11 of hoop-filaments, the outer double-sloped surface of which serves to incline the overlying helical-filaments 10 radially with respect to the axis (in opposite directions of radial inclination on both ramps of the double-ramp formation 11).

Figure 2E:
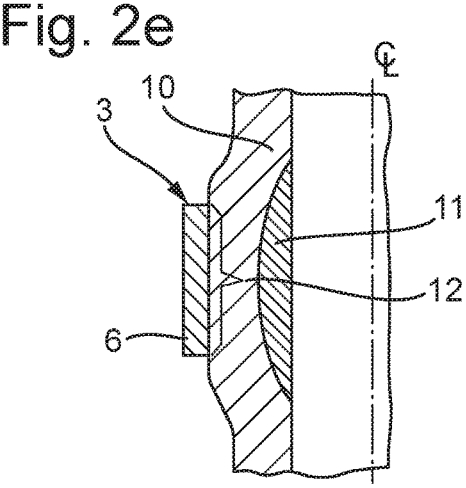

The ramp or ramps of the underlying formation of hoop-filaments 11 may have a generally straight outer surface profile (e.g., wedge-like profile as shown in FIGS. 2b, 2c and 2d) that the overlying helical-filaments 10 follow, or the ramp or ramps may have a curved outer surface profile (e.g., as shown in FIG. 2e) or a generally sinusoidal profile that places a more gradual change of inclination on the helical-filaments 10 at the ramp transitions. In other embodiments (not shown) the underlying ramp formation of hoop-filaments 11 may have an outer surface profile comprising a combination of curved and generally straight portions, as desired.

During forming of the cylinder 2, an underlying formation of hoop-filaments 11, for example, providing a double-ramp shape, may be formed on a mandrel first. The rest of the cylinder may then be formed using helical-filaments 10 at a range of angles to build up the wall of the cylinder (with additional hoop-filaments as desired) using, for example, filament-winding processes, braiding or other filament placing techniques. Where the filaments are laid on the mandrel, they will be generally at a constant distance from the axis depending on the depth of the layers, but in the interface region where the filaments are wound over the ramp formation, the filaments are redirected so as to flare radially outwards. This occurs in a mid-portion of the cylinder, usually towards the middle of the strut. After the cylinder 2 has been built up to a desired thickness, the mid-portion of the cylinder 2 over the hoop-filament ramp 11, will be thicker than the remainder of the cylinder 2. This thicker section may then be cut or ground down to a similar diameter to, or a slightly larger diameter than, the rest of the cylinder 2. As each of the plies (e.g., layers of filaments) in this region do not lie at a constant radius from the axis of the cylinder due to the bulge caused by the ramp of hoop filaments, the material removal process step exposes ends of helical-filaments 10 lying in the surface and intermediate layers for a significant number of the different plies of the composite cylinder, to create an interface region 12 overlying (i.e. radially outward from) one side of the double-ramp formation 11. When the mid-strut fitting is mounted on this interface region 12, the mid-strut fitting engages with a significant portion of the plies of filaments directly, for example, between 10-90%, to share its load transmission between all of those plies rather than concentrating load on a smaller number of surface plies.

The hoop-filaments of the underlying formation may represent more than 10% of the radial thickness of the cylinder wall, e.g., at a maximum thickness of the annular ramp. It may represent more than 20%, 30%, 40%, 50% or more. Where it is desired to maintain a volume of continuous layers of helical-filaments for transmitting axial load from one end of the cylinder to the other and providing bending resistance, the hoop-filaments 11 may represent less than 80% of the radial thickness of the cylinder 2, for example, less than 70%, 60% or 50% of the total wall thickness.

Where a ramp formation (single or double ramp) is provided, the helical-filaments 10 may be inclined radially at an angle of 1 to 15° to the axis of the cylinder 2, i.e., at a relatively shallow angle, the exact angle being dependent on a number of factors such as the length of the interface region and the size of the strut, etc. The filaments may be radially inclined at an angle of greater than 3 or 5°. The radial incline may be less than 12 or 10°.

When such a ramp formation of hoop-filaments 11 is used to incline the helical-filaments 10, at least in the interface region, portions of the helical-filaments 10 from surface and intermediate layers may have been removed, for example, by being cut or ground parallel to the axis of the cylinder, so as to expose ends of the helical-filaments 10 in the interface region (the ground flat surface of the interface region 12 can be seen in FIGS. 2b-2f). In this way, the plurality of teeth 7 on the mid-strut fitting 3 can engage with the exposed ends of the helical-filaments 10 to transmit and distribute axial and other forces directly into the layers of helical-filaments 10, reducing the reliance on interlaminar shear strength between the layers.

The hoop-filaments can be placed easily, for example, by winding, so as to build up accurately the profile of a double-ramp formation 11 at the desired gradient. The double-ramp formation 11 may allow a smooth transmission and distribution of forces either side of the interface region. It is not necessary for a thickest point 4 (the peak) to be at the centre of the double-ramp formation 11 and often the placement of hoop-filaments may continue beyond the interface region 12 on at least one side, e.g., towards or up to an end of the cylinder 2, to provide additional hoop strength to the composite cylinder 2 in that region. For example, on a landing gear shock strut 1, the hoop-filaments 11 may continue towards one or more ends of the strut.

By cutting or grinding the layers of helical-filaments 10 parallel to the axis in the interface region 12, there can be provided a cylindrical outer surface for mechanical engagement with the inner surface of the mid-strut fitting 3. If desired, the interface region 12 could be cut or ground with a taper but this would add to the complexity of the joint.

The internal diameter of the mid-strut fitting 3 excluding the projection of the teeth 7 may be sized very slightly larger (to allow movement) or very slightly smaller (to allow an interference fit to create compression upon fitting) than the outer diameter of the interface region 2. Taking account of the height of the teeth 7, the internal diameter of the mid-strut fitting 3 will be smaller than the outer diameter of the interface region 12 to ensure mechanical engagement of the teeth into the composite material of the cylinder 2. The exact choice of internal and external diameters will depend upon the materials used, the intended use of the cylinder 2 and the forces expected to be transmitted therethrough.

Alternatively, the mid-strut fitting 3 may be formed of two shells (not shown) which lock together around the cylinder 2, in which case the relative diameters of the interface region 12 and remainder of the cylinder 2 are of very little consequence. However material associated with fastening the shells together will add to the overall weight of the strut 1.

Figure 2F:
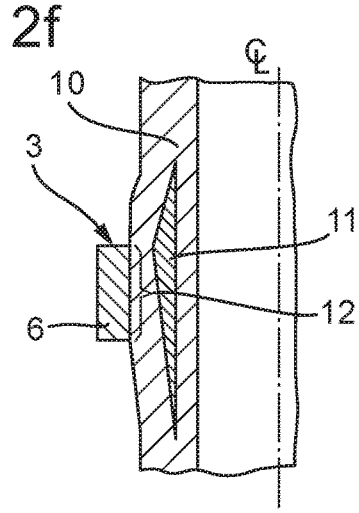

The mid-strut fitting 3 may be positioned over one of the ramps of a double-ramp formation 11, for example, as shown in FIGS. 2d and 2f (and over the exposed ends of the layers of helical-filaments 10 that are intended to carry the additional load from a brace or other component attached to the mid-strut fitting 3 as shown in FIG. 8 below). Alternatively, the mid-strut fitting 3 may extend over the peak 4 of the double-ramp formation 11 so that there is mechanical engagement with helical-filaments 10 on both sides of the peak 4 as shown in FIGS. 2c and 2e.

The mid-strut fitting 3, e.g., being of a high strength metal, may be intended to carry some or substantially all of the axial load for some of the interface region. It may provide a bridge for these various loads, picking up load from one area of the interface region 12 and delivering the load to another area. The mid-strut fitting 3 may also be intended to transmit and distribute bending forces encountered in this region.

Figure 3A:
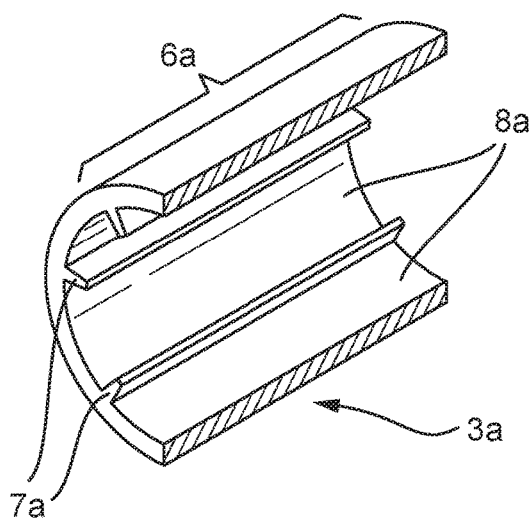
FIG. 3a shows axially aligned teeth in the cylindrical attachment part of an exemplary mid-strut fitting in more detail.
Figure 3B:
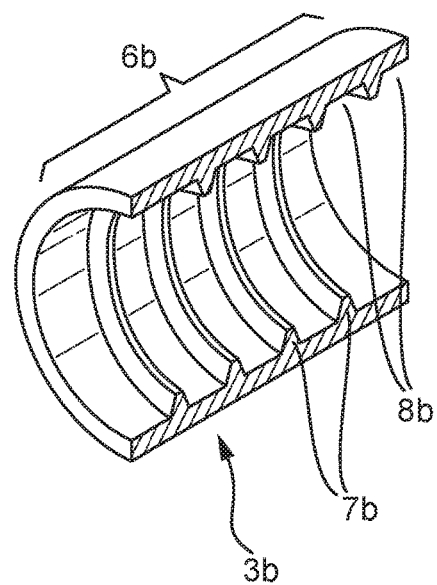
FIG. 3b shows circumferentially aligned teeth in the cylindrical attachment part of an exemplary mid-strut fitting in more detail.
Figure 3C:
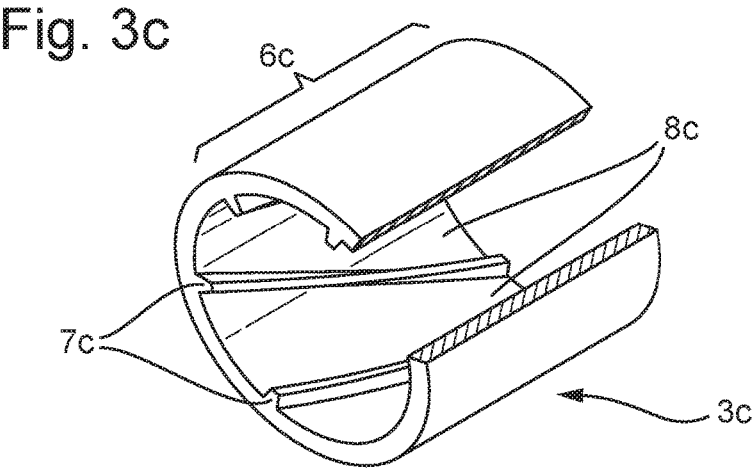
FIG. 3c shows teeth angled between the axial and circumferential directions in the cylindrical attachment part of an exemplary mid-strut fitting in more detail.

The detailed views of FIGS. 3a-c show how the profile of the cylindrical attachment part 6a, 6b, 6c may be made up of teeth 7 having cutting portions 7a, 7b, 7c and flat land portions 8a, 8b, 8c between. Further details of the teeth 7 can be seen in FIGS. 9a and 9b.

The arrangement of the teeth 7a in mid-strut fitting 3a shown in FIG. 3a is optimised for transmitting torque, as these teeth are aligned generally in the axial direction of the composite cylinder 2.

The arrangement of the teeth 7b in mid-strut fitting 3b shown in FIG. 3b is optimised for transmitting tension/compression, as these teeth are aligned generally in the circumferential direction of the composite cylinder 2.

The arrangement of the teeth 7c in mid-strut fitting 3c shown in FIG. 3c is optimised for transmitting a mixture of tension/compression and torque, as these teeth are arranged to extend in a direction in between the axial and circumferential directions of the composite cylinder 2.

The teeth 7 may be specifically arranged at an angle which is optimised for transmitting the relative amounts of tension/compression and torque load for a particular structural configuration. For example, if the torque loading on the joint will be twice as great as the tension/compression loading, the teeth 7c may be arranged to extend at an angle of 30 degrees from the axial direction of the composite cylinder 2 (i.e. at 60 degrees from the circumferential direction of the composite cylinder 2).

The mid-strut fitting 3b shown in FIG. 3b, for example, may be a single-start thread so the multiple teeth 7 shown in FIG. 3b may in fact all be part of the same helical thread. Similarly, all of the flat lands 8b may be part of the same helical thread.

Alternatively, the mid-strut fitting 3b shown in FIG. 3b, for example, may be a multiple-start thread so the multiple teeth 7b shown in FIG. 3b may in fact all be part of different helical threads, or may be grouped into a number of helical threads. Similarly, all of the flat lands 8b may be part of different helical threads, or may be grouped into a number of helical threads.

The plurality of teeth 7 that engage the cylinder 2 in the interface region 12 may comprise a plurality of splines or one or more threads running generally circumferentially around the inner surface of the mid-strut fitting 3. Providing axial teeth for engagement with the interface region 12 makes the joint more suitable for transmitting torque loads, while providing circumferential teeth makes the joint more suitable for transmitting axial loads (i.e. tension/compression). Additionally, or instead, some or all of the teeth 7 may be arranged inclined somewhere between the axial and circumferential directions to transmit both tension/compression and torque loads.

The mid-strut fitting 3 may comprise two ring-shaped parts 3d, 3e as shown in FIG. 8. To maximise the efficiency of force transfer in a rotational direction (i.e. for torque) for the first part or portion, the teeth may be made as longitudinally aligned as possible with the cylinder axis (i.e. they extend generally axially or have a substantial axial component to their path). The teeth 7 of this first part/portion may extend at an angle of between 0 and 45° to the axis, for example, or even an angle of between 0 to 25°. To maximise the efficiency of force transfer in the axial direction (i.e. for tension/compression) for the other part or portion, the teeth 7 may be aligned as perpendicularly as possible to the cylinder axis (i.e. they extend generally circumferentially or have a substantial circumferential component to their path). The second part/portion may have teeth 7 which extend at an angle of between 45 to 90° to the axis, for example, or even an angle of 65 to 90°. One or more parts may carry one or more lugs for attachment of other components. A first part may be mounted by driving it axially (possibly with some rotation) onto the interface region 12, while a second part may be mounted by screwing it onto the interface region 12 until it reaches and/or abuts the first part.

Thus there may be an array of teeth 7 to transmit axial loads and an array of teeth 7 to transmit torque. These may be provided as separate arrays, e.g., on different annular parts that are subsequently fixed together, or as combined arrays of teeth in different directions, e.g., on a single annular part that is fitted over the interface region 12. In both scenarios, the area, depth, angle etc., of the various teeth can be selected to optimise the joint to the intended loads.

Fabricating the mid-strut fitting 3 as two separate components 3d, 3e makes it simpler to manufacture and to drive the parts onto the interface region 12. Once they are in position the first and second parts may mate together. An arrangement may be provided to lock the portions together. This may be a mechanical connection, for example, a fastener or inter-engaging surfaces. Alternatively, or additionally, they may be locked together with an adhesive, for example a resin such as an epoxy resin, or they may be fused together through welding, brazing, etc. In some instances, it may be desirable to make the mid-strut fitting 3 from three or four ring-shaped parts, e.g., where the fitting 3 is acting to bridge load across the interface region 12.

Figure 4:
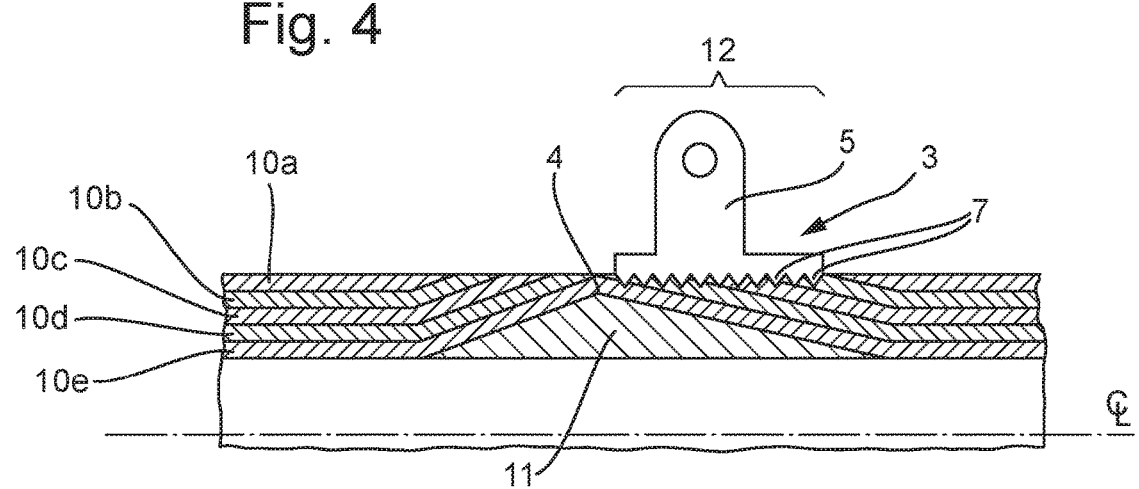
FIG. 4 illustrates an exemplary strut construction.

FIG. 4 is a cross-section illustrating the construction of the cylinder 2. FIG. 4 is schematic in nature as it shows layers of helical-filaments, plies 10a-e, much larger than in a real example. Also, the plies 10 in FIG. 4 are shown in section and so do not illustrate that the filaments are placed helically. The size of the hoop-filament formation is also not drawn to scale.

The exemplary cylinder 2 illustrated in FIG. 4 is made up of 5 plies 10 (individually labelled 10a-10e). At a midportion of the cylinder 2, e.g., distal from the ends of the cylinder 2, a double-ramp formation 11 (a sub-structure comprising back to back annular wedges) has been formed from hoop-wound filaments, with the double-ramp's thickness building up from each end of the ramp towards a thickest central portion 4 at the middle. The helically-wound plies 10 are then wound on top of the double-ramp formation 11.

As can be seen in FIG. 4, as the plies 10 pass over the top of the hoop-wound double-ramp formation 11, they flare radially outwardly (i.e. the double-ramp formation 11 causes the plies 10 to follow a path with a radial component rather than purely axial and circumferential components). An interface region 12 is formed by grinding down a significant number of helical plies 10, e.g., at least on one side of the double-ramp formation 11 as shown, so as to substantially conform the thickness with the rest of the cylinder 2 (usually this interface region 12 has an outer diameter which is slightly larger than the outer diameter of at least part of the cylinder 2 so that the mid-strut fitting 3 can be slipped over the cylinder 2 to the interface region 12).

The grinding process described above leads to the formation of exposed ends of the helical-filaments across the surface layer of plies 10a and one or more intermediate layers of plies 10b-10e such that a substantial number of the plies, interface with the teeth 7 of mid-strut fitting 3. As the teeth 7 of mid-strut fitting 3 interface with multiple plies, forces are transmitted and distributed between the mid-strut fitting 3 and the cylinder 2 directly via the layers of helical-filaments 10. In this way, this arrangement becomes less reliant on the interlaminar shear stress of the composite cylinder 2 for force transmission. It may be acceptable to set a higher critical flaw size while still meeting industry standards.

The radial inclination of the filaments in the interface region 12 (followed by cutting or grinding to expose the filament ends) also helps to align the filaments 10 for transmitting the additional loads (which usually include transverse components) from braces or other parts of a structure into the cylinder 2, increasing the ability of the joint to transmit loads through the body of the cylinder 2.

Thus the radial inclination of the helical-filaments 10 in the interface region 12 enables axial force to be carried more easily by the filaments, since the load is passed directly into the filaments instead of indirectly through interlaminar shear stress, and since the helical-filaments 10 are inclined radially outward, they will more easily guide and transfer the additional load down the length of the filaments 10.

In some arrangements it may be desirable for the teeth 7 of the mid-strut fitting 3 to engage with more than 30% of the layers of helical-filaments 10, for example, more than 50%, 60%, 70%, 80%, 90% or even more than 95% of the helical-filaments 10. Where larger numbers of layers are being engaged, the mid-strut fitting 3 may be positioned on the cylinder 2 so as to engage exposed ends of helical-filaments 10 of opposite radial-inclination on opposite sides of a double-ramp formation of hoop-filaments 11 to bridge load across the interface region 12.

Figure 5:
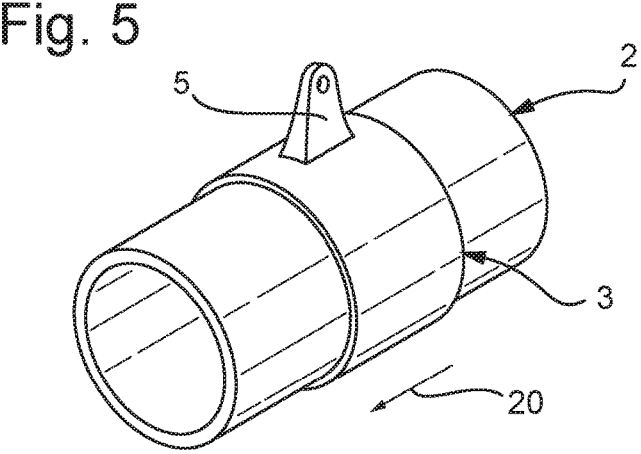
FIG. 5 illustrates an exemplary cylinder in the process of having a mid-strut fitting mounted.

FIG. 5 shows an exemplary mid-strut fitting 3 part way through mounting onto cylinder 2. Arrow 20 indicates an axial driving force applied to the mid-strut fitting 3 so as to drive the mid-strut fitting 3 in the axial direction of the cylinder 2.

Figure 6:
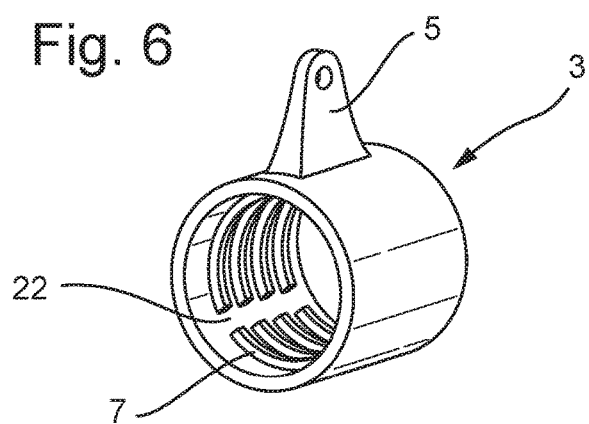
FIG. 6 shows a mid-strut fitting with grooves across the circumferential teeth.

FIG. 6 shows a perspective view of an exemplary mid-strut fitting 3. The teeth 7 are shown as circumferential teeth, but these may also be angled teeth. The teeth 7 are interrupted by axial or helical gaps 22 that allow passage of material cuttings which collect in the channels 23 between the teeth (see also FIGS. 9a and 9b) out of the joint. Any number of axial/helical gaps 22 may be provided, for example, four are illustrated in FIG. 6.

Figure 7:
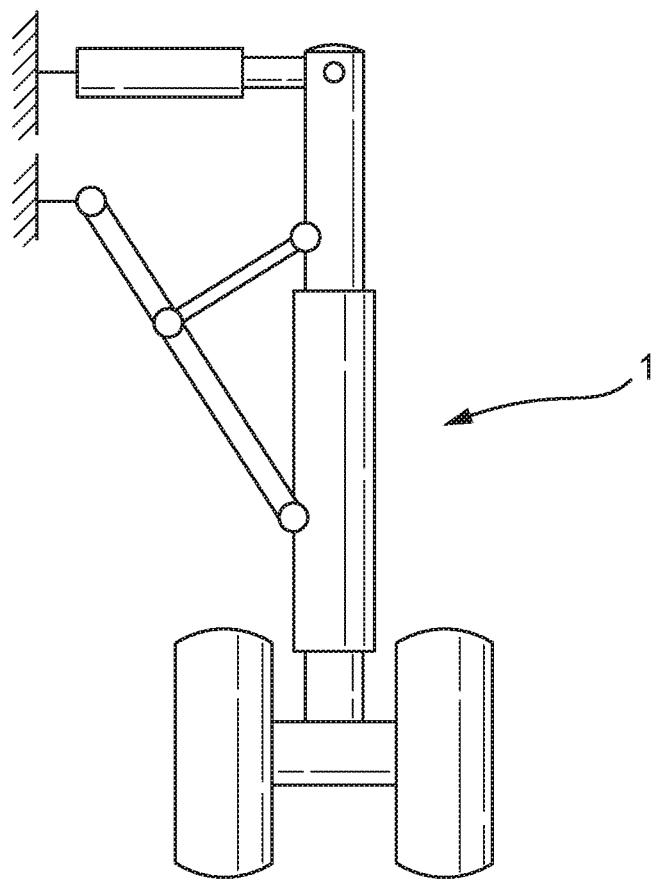
FIG. 7 illustrates schematically an aircraft landing gear comprising a shock strut.

FIG. 7 shows a schematic view of an exemplary landing gear where the strut of the present disclosure could be used in place of a conventional metallic shock strut.

FIG. 8 shows an embodiment having a different flange 5 to the embodiment shown in FIGS. 1 and 4-6. This flange comprises a pair of parallel flanges 5 arranged to sandwich a bearing, brace, incoming strut, tie rod, plate or other component. The direction for connection is orthogonal to the flange 5 of the first embodiment, allowing rotation about an axis passing through the flange that is parallel to the axis of the cylinder 2.

As can also be seen from FIG. 8, the interface region 12 may not be centralised radially outwardly from the double-ramp formation 11 of hoop fibres, rather it may be located radially outwardly over one end of the double-ramp formation 11.

Moreover, the mid-strut fitting 3 of FIG. 8 is split into two parts 3*d*, 3*e*. Part 3*d* is arranged to have teeth which are aligned in a direction which is mostly circumferential with respect to the cylinder. This can be seen clearly by teeth 7 in FIG. 9*a*, which is a close-up view of a part of the interface region of the strut. Thus this large part 3*d* of the mid-strut fitting 3 provides good transmission of axial loads between the mid-strut fitting 3 and the filament ends which are exposed at the interface region 12 of the cylinder 2. Each part 3*d*, 3*e* may have teeth 7 (cutting portions) and flat portions 8 arranged at the same or similar angle to the teeth of the other part 3*d*, 3*e*. Alternatively or additionally, each part 3*d*, 3*e* may have the teeth 7 arranged at a different angle to the teeth of the other part 3*d*, 3*e*. The parts 3*d*, 3*e* of the mid-strut fitting 3 may be formed separately and subsequently connected to one another. The locking together may include bolts, gluing, screwing, welding, a combination of the above or any other fastening or combination of fastenings known to the skilled person.

The joint is structurally efficient in that it achieves an excellent shear strength between the cylinder 2 and mid-strut fitting 3 with a relatively small quantity of metal to provide the mid-strut fitting 3, thus reducing weight and potentially the cost of the overall strut. The mid-strut fitting 3 is also mechanically simple to manufacture and join in that it can be made as separate components that can be locked together easily.

Assembly of the joint is carried out by way of sliding the mid-strut fitting 3 axially relative to the cylinder 2. The inner diameter of the mid-strut fitting 3 may be greater than an outer diameter of the cylinder 2 leading up to the interface region (i.e., a non-interface region) so as to avoid harm to the surface of the cylinder 2. The outer diameter of the interface region 12 of the cylinder 2 is accordingly larger than the outer diameter of at least one end of the cylinder 2 leading up to the interface region, such that the mid-strut fitting 3 can have a tight interference fit with the interface region of the cylinder 2, but can easily slide towards the interface region without damaging the cylinder 2.

Figure 9A:
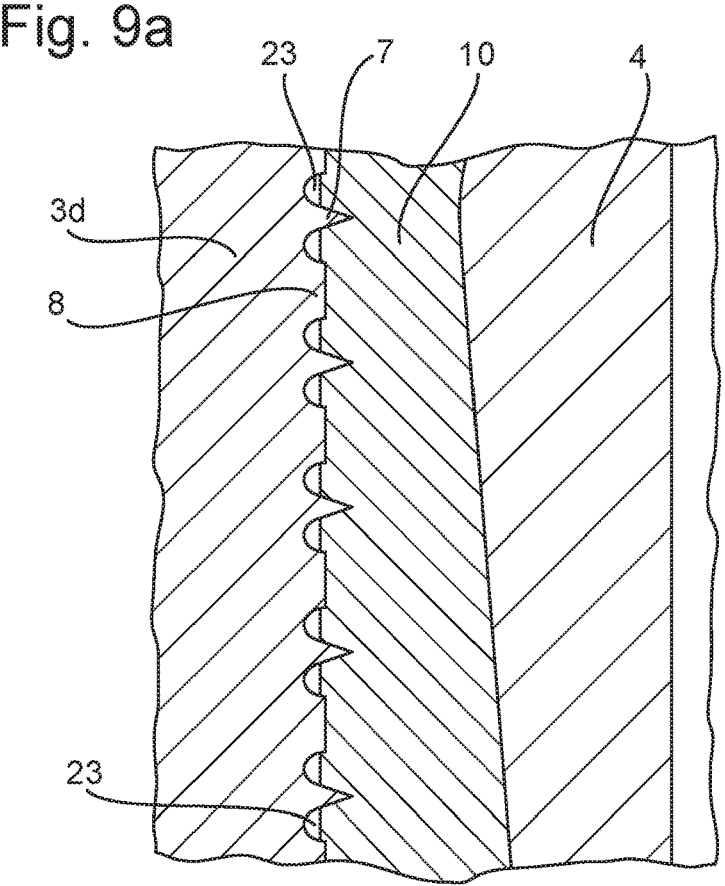
FIG. 9a shows schematically a cross-section through one part of the mid-strut fitting showing the teeth on an inner circumferential surface of that part of the mid-strut fitting.
Figure 9B:
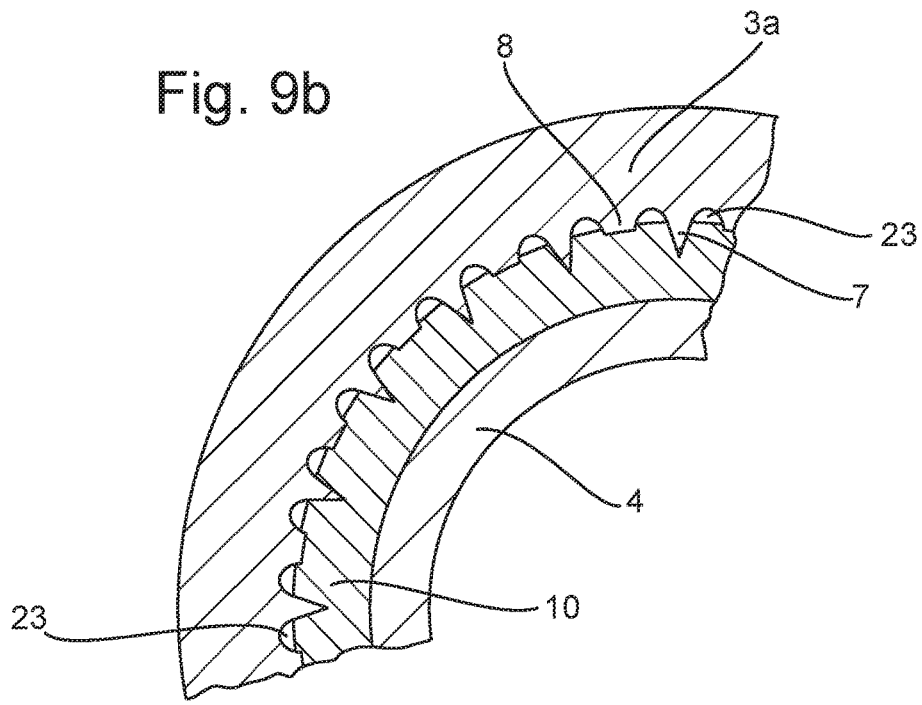
FIG. 9b shows schematically a cross-section through a second part of the mid-strut fitting showing the teeth on an inner circumferential surface of that part of the mid-strut fitting.

FIG. 9*a* shows schematically a cross-section through one part 3*d* of the mid-strut fitting 3 by way of an enlargement of FIG. 8, showing the teeth 7 on the inner circumferential surface of that part and FIG. 9*b* shows a cross-section along the line 9-9 shown in FIG. 8 through a second part 3*e* of the mid-strut fitting 3 showing the teeth 7 provided on the inner circumferential surface of that part.

Thus as shown in FIG. 9*a*, the teeth 7 may have a profile that comprises a cutting tooth portion arranged to cut into the interface region 12 and a substantially flat land portion 8 that frictionally engages with the interface region 12. For example, the cutting portion may have a sharp, inwardly projecting, triangular cross-section, and the flat land portion 8 may have an arcuate cross-section that follows the curvature of the underlying cylindrical surface of the composite cylinder. Such a profile has been found to offer benefits in terms of the force transmission and strength of connection. It can also offer benefits in terms of helping to avoid fretting fatigue. The profile may further comprise at least one channel portion 23 adjacent to the cutting tooth portion 7 to accommodate debris produced during a mounting process. The channel portion 23 may be provided between the tooth portion 7 and the flat land portion 8. There may be two channel portions 23 associated with each tooth 7, one each side of the tooth 7, and two flat land portions 8, each on the other side of a respective channel portion 23.

The mid-strut fitting may further comprise gaps 22 across such teeth (see FIG. 6) that divide the teeth 7 into a plurality of part-teeth. By way of example, the gaps may be axial gaps, inclined gaps or helical gaps. The gaps have the advantage of reducing the torque required to affix the mid-strut fitting, i.e. the gaps may allow the stresses within the composite to dissipate a little. This can assist with the mounting of the mid-strut fitting 3 and the maintaining the integrity of the joint. Any number of such gaps 22 may be used providing sufficient tooth engagement remains to keep the joint parts securely fixed together and to ensure effective load transfer across the joint. The gaps 22 may provide passage for debris which has accumulated in the channels 23.

The "mid-portion" of the cylinder 2 is any region of the cylinder spaced a distance from both ends (the mid-strut fitting 3 is not an end fitting). The mid-portion may correspond to 10% to 90% of the length of the cylinder, for example, 25% to 75% of the cylinder length, or even 33 to 67% of the cylinder 2. It is also not necessary for the interface region 12 to be located at exactly the midpoint of the cylinder 2. It may be located closer to one end of the cylinder 2 than the other, and most often this is the case.

The regions either side of the interface region 12 do not need to be identical but can be adapted to optimise weight for the intended loads. A region of the cylinder 2 axially to one side of the interface region 12 may have fewer layers of helical-filaments 10 than a region located at the axially opposite side of the interface region 12 for example. This may be achieved through not continuing the helical-filaments 10 of the surface and intermediate layers which have been cut or ground on the side of the interface region 12 carrying smaller axial loads. It may also be achieved by cutting or grinding excess filaments 10 away. Additional hoop-filaments 11 (and helical-filaments 10) may be provided in the non-interface regions to help transmit and distribute forces as necessary.

The mid-strut fitting may be generally isotropic, in comparison to the orthotropic properties of the composite cylinder. For example, the mid-strut fitting may be metallic. It may be cast or forged from steel or other lighter-weight material such as titanium or aluminium. It may have a complex shape and provide attachment features for other components, for example, one or more lugs or a flanged portion to which external components can be attached so that the strut may act as a force transmission component.

Viewed from another aspect, this disclosure provides an isotropic mid-strut fitting for mounting onto a mid-portion of an orthotropic composite cylinder, the mid-strut fitting comprising an annular portion having a plurality of teeth arranged on an internal circumferential surface, the mid-strut fitting being formed from two or more parts, one part having teeth which are arranged at an angle of between 0 and 45° to the axis, and a second part having teeth which are arranged at an angle of between 45 to 90° to the axis. All of the optional features of the mid-strut fitting that have been described above naturally also apply to this aspect of the disclosure.

The completed strut may be for an aircraft. The strut may be part of an aircraft's landing gear. It may be a shock strut, where the cylinder of the present disclosure comprises the shock strut's cylinder. The mid-strut fitting may be attached to a brace of a landing gear. However, it will be appreciated that the joint described here may be used in a wide range of applications where tension/compression/torque, etc. may be transmitted to a cylinder. While some example applications include aerospace applications, such as landing gear struts etc., the present disclosure has wider application than this and is not limited to such struts.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A strut comprising a composite cylinder with a mid-strut fitting mounted on an interface region in a mid-portion of said cylinder, wherein:
    said cylinder comprises layers of filaments laid in a helical configuration to define a cylinder wall having an outer surface with an outer diameter,
    wherein at least in said interface region, layers of the helical-filaments are displaced radially-outward by an underlying formation,
    wherein a wall thickness of the cylinder in the interference region is greater than a wall thickness in a remainder of the cylinder on either side of the interface region so as to provide an enlarged outer diameter for the cylinder at the interface region in the mid-portion of the cylinder, and
    wherein a plurality of teeth are provided on an inner circumferential surface of the mid-strut fitting, the plurality of teeth being sized to allow the mid-strut fitting, during mounting thereof onto the cylinder, to be slid into an interference fit with the interface region of the cylinder without damaging the outer surface of the cylinder on either side of the interface region,
    wherein the plurality of teeth engage with one or more layers of the helical-filaments in the interface region to make a mechanical connection.

2. A strut as claimed in claim 1, wherein the underlying formation comprises an annular step of hoop-filaments, that is of a radial-height which is greater than a radially-inward projection of the plurality of teeth of the mid-strut fitting.

3. A strut as claimed in claim 1, wherein the underlying formation of hoop-filaments comprises an annular ramp of hoop-filaments, the outer surface of which serves to radially-incline layers of overlying helical-filaments with respect to an axis of the cylinder such that they follow a path with a radial component over the ramp, and wherein the underlying formation comprises a double-ramp formation of hoop-filaments, which serves to radially-incline layers of overlying helical-filaments with respect to the axis of the cylinder over each ramp.

4. A strut as claimed in claim 1, wherein at least in the interface region, portions of filaments in surface and intermediate layers have been removed so as to expose ends of the filaments in those layers.

5. A strut as claimed in claim 3, wherein at least in the interface region, the inclined filaments are inclined radially at an angle of 1 to 15° to the axis.

6. A strut as claimed claim 1, wherein a maximum thickness of the underlying formation represents between 10-90% of a radial thickness of the cylinder wall.

7. A strut as claimed claim 6, wherein a maximum thickness of the underlying formation represents between 25-75% of a radial thickness of the cylinder wall.

8. A strut as claimed in claim 1, wherein the underlying formation extends radially-outward from an inner surface of the cylinder; or wherein the underlying formation extends radially-outward from an intermediate layer of the filaments within the cylinder.

9. A strut as claimed in claim 1, wherein the underlying formation is formed of hoop-filaments.

10. A strut as claimed in claim 1, wherein said teeth have a profile that comprises a cutting tooth portion arranged to cut into said interface region and a substantially flat land portion that frictionally engages with said interface region.

11. A strut as claimed in claim 1, wherein said mid-strut fitting further comprises gaps across the teeth that divide the teeth into a plurality of part-teeth.

12. A strut as claimed in claim 1, wherein the mid-strut fitting comprises first and second portions, the first portion having teeth which extend at an angle of between 0 and 45° to the axis and a second portion having teeth which extend at an angle of between 45 to 90° to the axis.

13. A strut as claimed in claim 12, wherein the first portion has teeth which extend at an angle of between 0 to 25° and the second portion has teeth which extend at an angle of between 65 to 90° to the axis.

14. A strut as claimed in claim 1, wherein the mid-strut fitting is a metallic lug.

15. A strut as claimed in claim 1, wherein the strut is an aircraft shock strut cylinder.

16. A method of mounting a mid-strut fitting onto a composite cylinder to form a strut, comprising:
    installing a formation during a lay-up of filaments which are being placed to form a wall of the cylinder, the formation being positioned in a mid-portion of said cylinder;
    placing layers of helical-filaments to build up the wall of the cylinder including placing layers of helical-filaments over the formation, the overlaying helical-filaments being displaced radially-outward compared to a remainder of the cylinder by the underlying formation in the mid-portion of the cylinder to provide an interface region for a mid-strut fitting, wherein a wall thickness of the cylinder in the interface region is greater than a wall thickness in a remainder of the cylinder on either side of the interface region so as to provide an enlarged outer diameter for the cylinder at the interface region; and mounting said mid-strut fitting onto said cylinder by sliding the mid-strut fitting into an interference fit with the interface region of the cylinder without damaging the cylinder on either side of the interface region and by engaging a plurality of teeth provided on an inner circumferential surface of the mid-strut fitting into said interface region to provide a mechanical connection between the mid-strut fitting and the composite cylinder.

17. A method as claimed in claim 16, wherein the step of installing a formation comprises placing hoop filaments to form the formation.

18. The method of claim 16 further including:
curing the composite cylinder; and
removing portions of helical-filaments from surface and intermediate layers such that ends of those filaments are exposed in said interface region.

19. A method as claimed in claim 16, wherein the underlying formation is formed by placing hoop-filaments as onto an intermediate layer of helical-filaments prior to placing further layers of helical-filaments.

\* \* \* \* \*